May 2, 1961　　　　M. E. CHUN　　　　2,982,941
DIRECTIONAL SOUND APPARATUS
Filed July 17, 1950　　　　　　　　　　2 Sheets-Sheet 1
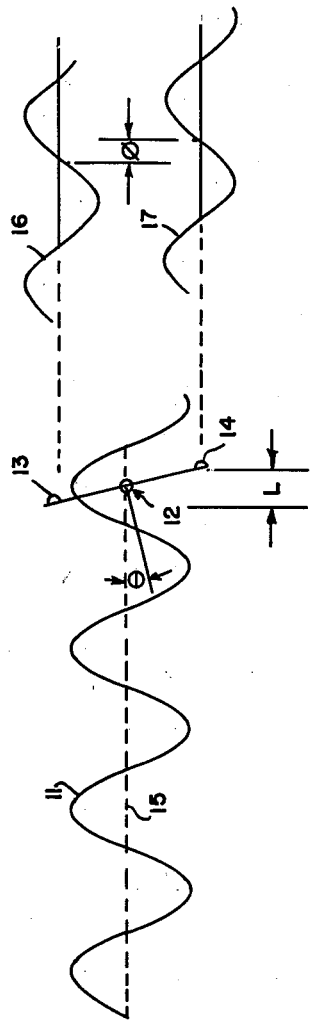
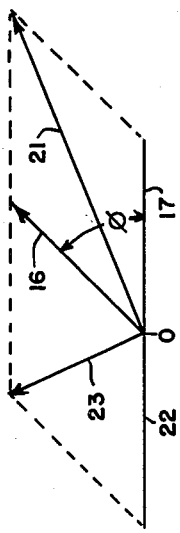
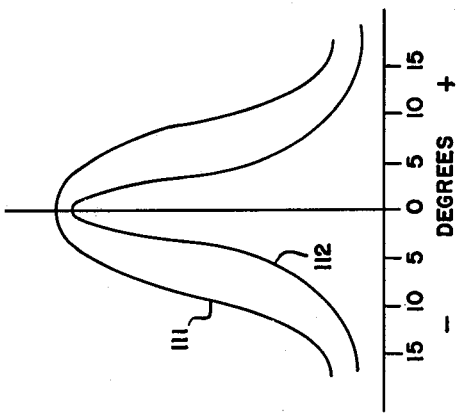
INVENTOR
MELVIN E. CHUN
BY
ATTORNEYS

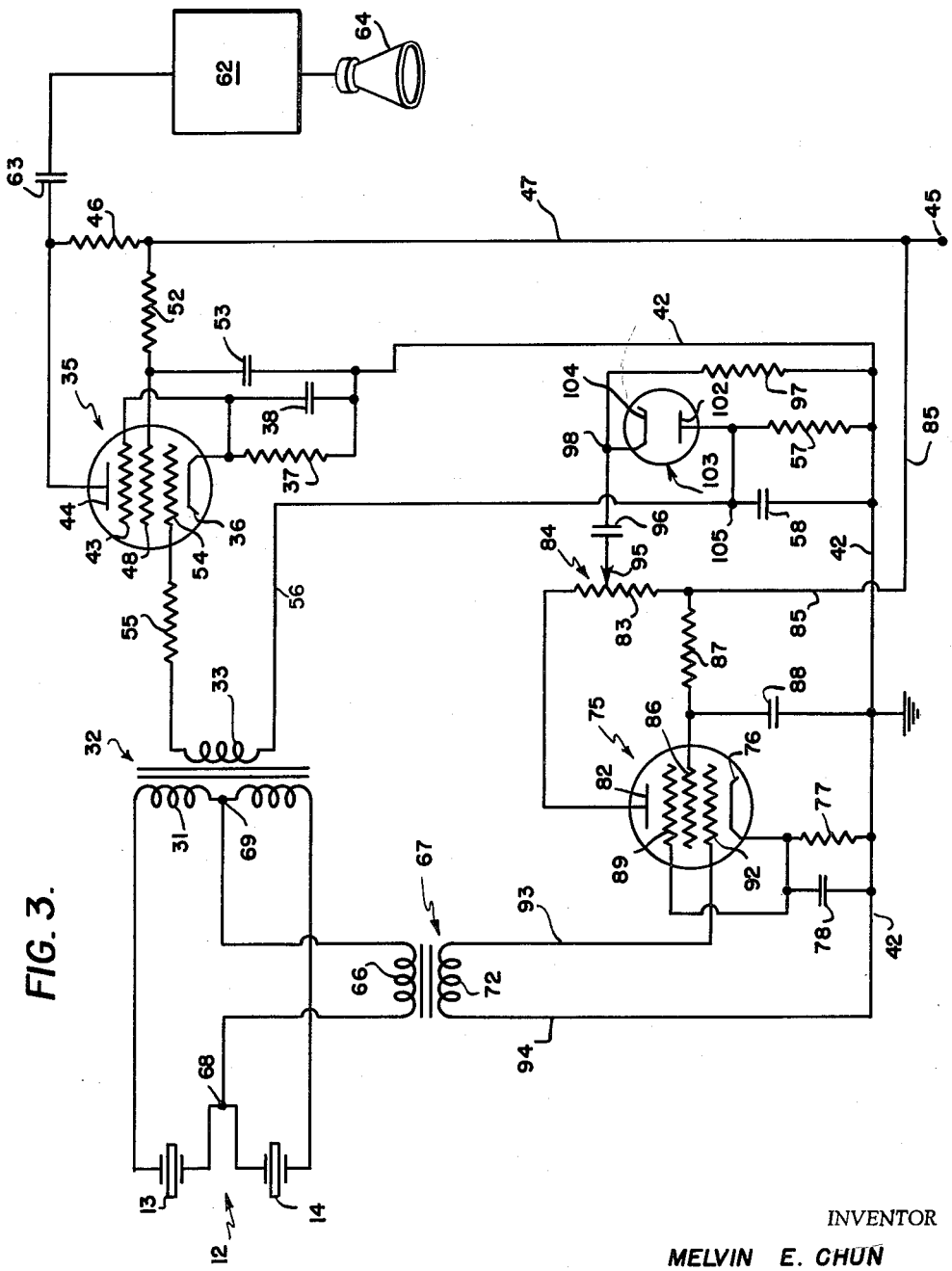

United States Patent Office 2,982,941
Patented May 2, 1961

2,982,941
DIRECTIONAL SOUND APPARATUS

Melvin E. Chun, Berkeley, Calif., assignor to the United States of America as represented by the Secretary of the Navy Filed July 17, 1950, Ser. No. 174,276

4 Claims. (Cl. 340—16)

The present invention relates to direction-finding equipment and more particularly to direction-finding equipment having a highly directional characteristic.

Presently available direction-finding systems for determining the direction to a source of sound are divided into two general classes, the binaural systems and maximum systems. The binaural system comprising two spaced receivers arranged to be rotated as a unit by the operator each connected to a separate amplifier and reproducer worn by the operator so that the operator, in effect, has two sensitive ears spaced from each other by a considerable distance. Such a system must employ considerable equipment and involve mechanical difficulties in mounting and operation, and, in addition, require an experienced operator to secure accurate directional determination.

The maximum system employs a single receiver rotatable by the operator and connected to a single amplifier and reproducer, so that the operator rotates the receiver for maximum response. The system requires a receiver having as narrow directional response as possible in order to obtain accurate results, but the use of a narrow directional response makes it difficult for the operator to locate a weak sound because he may move past it before he recognizes it. Any practical design is therefore a compromise, and the results obtained from the system are not extremely accurate, although the system may be operated by inexperienced operators and employs simple equipment.

A receiver for sound has a relatively broad directional characteristic at best, and the characteristic is fixed by the design of the particular receiver. The present invention is directed to a direction finding system employing the maximum system in which the directional characteristic of the installation is more directional than the receiver itself and in which the directional characteristic is readily adjustable by employing a divided receiver which produces two independent output voltages and combining the two voltages to produce two individualized voltages, one proportional to the sum of the output voltages and the other proportional to the difference between the two output voltages. The sum voltage is amplified by an amplifier whose amplification factor is controlled in inverse ratio to the amplitude of the difference voltage to sharpen the response of the receiver, and the degree of sharpening may be readily controlled by varying the amplitude of the difference voltage. As will be hereinafter explained the sum of the outputs is a maximum when the receivers are positioned perpendicular to the direction to the sound while the difference is zero, and when the sum of the outputs is a minimum, the difference beteeen the outputs is a maximum. The output proportional to the sum of the receivers is impressed on an amplifier whose amplification is controlled by the output proportional to the difference between the response of the receivers.

It is an object of the present invention to provide an accurate direction-finding system operating on the maximum response method.

It is a further object of the present invention to provide a direction-finding system in which the amplification of the apparatus is controlled in inverse proportion to the angular displacement of facing of the receiver from the direction to the sound source.

It is a still further object of the present invention to provide a direction-finding system in which the sum of the outputs of two receivers is amplified in inverse proportion to the difference between the two outputs.

It is a still further object to provide a direction finding system in which the directivity is readily adjustable.

Further objects and advantages of the present invention will become apparent to those skilled in the art as the disclosure is made in the following detailed description of a preferred embodiment of the invention as illustrated in the accompanying drawings in which:

Fig. 1 is a diagram illustrating the operation of the receivers in the present invention;

Fig. 2 is a vector diagram illustrating the operation of the receivers in the present invention;

Fig. 3 is a schematic wiring diagram illustrating a preferred embodiment of the present invention; and Fig. 4 is a diagram illustrating the operation of the present invention.

Referring now to the drawings, wherein like reference characters designate like or corresponding parts throughout the several views, there is shown in Fig. 1 a representation of a sound wave 11 moving toward the right of the drawing and impinging on the sound responsive device 12 which comprises two spaced receivers 13 and 14. Since the sound responsive device 12 is situated obliquely to the axis 15 of the wave 11 with the receiver 13 closer to the origin of the sound by a distance L, the response of the receiver 13 represented by the wave 16 will lead the response of receiver 14 represented by the wave 17 by the angle $\phi$ which is directly related to the angle $\theta$ representing the angle between the wave axis 15 and the perpendicular bisector of the energy responsive device 12. The angle $\phi$ becomes zero when the receivers are equidistant from the sound source and is equal to 180° when the distance L becomes equal to one half wave-length.

Referring to Fig. 2, the wave 16 is represented by the vector 16 which leads the vector 17 representing the wave 17 by the angle $\phi$, the sum of the vectors 16 and 17 being represented by the vector 21. The vector 22 represents the vector 17 reversed in direction, and the vector 23 represents the difference between the vectors 16 and 17. It will be readily apparent by inspection of the vector diagram that a decrease in the angle $\phi$ will increase the length of the vector 21 and decrease the length of the vector 23, while an increase in the angle $\phi$ will produce the opposite effect. It will be observed that the vector 21 becomes maximum when the angle $\phi$ is equal to zero at which time the vector 23 also becomes zero, and that the vector 21 becomes zero when the angle $\phi$ is equal to 180° at which time the vector 23 becomes maximum. The length of the vectors 16 and 17 will remain equal because the receivers 13 and 14 have similar characteristics, but the length will depend upon the strength of the energy impinging on the receivers and upon the direction of impingement and the directional characteristics of the particular receivers employed which control the response of the receiver.

Therefore, as the operator rotates the sound responsive device 12 in a direction to bring the receivers 13 and 14 equidistant from the source of sound, the vector 23 passes through maximum and decreases in magnitude as the angle $\theta$ decreases. At the same time, the vector 21 increases toward a maximum. The voltage represented by the vector 21 varies in accordance with the directional characteristics of the receivers 13 and 14 and changes in its magnitude are quite gradual. However, if this voltage is amplified in inverse proportion to the voltage represented by the vector 23, the response of the system is reduced when the receivers 13 and 14 are not equidistant from the source and rises sharply as the angle $\theta$ approaches zero. The attenuation produced by the voltage represented by the vector 23 may be readily adjusted by varying the sensitivity of the circuit to changes in that voltage or by changing the relative proportion of the voltage.

Referring now to Fig. 3, the sound energy responsive device 12 may take any convenient form such as a hydrophone in water, or microphones in air for receiving sound energy, and is divided into two equivalent sections displaced from each other in the plane in which direction is to be determined by a distance which is considerable with respect to the wave length of the energy to be received. Since sound travels at relatively low speeds, the spacing required at moderate frequencies is quite small, being considerably under one foot at 1000 cycles per second, sound energy device 12 should have sharp directional characteristics to eliminate extraneous noises and to increase the overall directivity of the system. In installations where it is intended to receive sounds of several kilocycles in water, hydrophones of the crystal or magneto-strictive types may be employed spaced from each other by a few inches.

The receivers 13 and 14 are connected in series and the combined outputs are impressed on the center-tapped primary winding 31 of the transformer 32. The voltage induced in the secondary winding 33 is impressed on the input of the variable amplification factor or remote cut-off pentode tube 35, which tube may be, although not limited to, the type 6SK7. The cathode 36 of the tube 35 is connected to ground through the biasing resistance 37 by-passed by the capacitance 38 and the wire 42, while the suppresser grid 43 is connected to the cathode 36. The plate 44 of the tube 35 is connected to the positive plate supply terminal 45 through the plate resistor 46 and the wire 47, while the screen grid 48 is connected to the positive plate supply terminal by the wire 47 and the resistance 52. A capacitance 53 is connected between the screen grid 48 and the wire 42 to prevent fluctuations in the voltage impressed thereon.

One terminal of the secondary winding 33 is connected to the control grid 54, the resistor 55 being inserted therebetween to prevent excessive grid currents, and the other terminal of the secondary winding is connected by wire 56 to the resistance 57 which is connected to ground and paralleled by the capacitance 58 which prevents rapid fluctuation in the voltage across the resistance 57. The output voltage of the tube 35 is impressed on the amplifier 62 through the coupling condenser 63, and the output of the amplifier 62 is impressed on the reproducing means 64, which may be a loudspeaker or a headset worn by the operator. If desired, a recorder or a visual indicator such as a meter, a cathode beam tube, or a cathode ray tube, may be employed instead of or in addition to the reproducing means 64, in well-known methods.

The primary winding 66 of the transformer 67 is connected between the junction 68 of the receivers 13 and 14 and the center-tap 69 of the primary winding 31 to provide a voltage proportional to the difference between the outputs of the receivers 13, 14, the induced voltage of secondary winding 72 being impressed on the input circuit of the tube 75.

The tube 75 is operated as a conventional amplifier, and may be of any desired type, such as a type 6SJ7 sharp cut-off pentode tube which provides high amplification. The cathode 76 of the tube is connected to ground through the bias resistor 77 paralleled by the capacitor 78, and the plate 82 is connected to the positive plate source terminal 45 through the resistance element 83 of the potentiometer 84 and the wire 85. The screen grid 86 of the tube 75 is connected to the terminal 45 through the resistance 87 and the wire 85, the capacitance 88 being connected between the screen grid 86 and ground to prevent fluctuations in the screen grid voltage, while the suppresser grid 89 is connected to the cathode 76.

The secondary winding 72 of the transformer 67 is connected between the control grid 92 of the tube 75 and ground by wires 93 and 94 respectively, and the output of the tube is taken off from the movable arm 95 of the potentiometer 84 by the condenser 96 and the resistance 97. The voltage appearing across the resistor 97 will be similar to the voltage induced in the secondary winding 72 of the transformer 67 except that it is inverted and amplified, and appears between the point 98 and ground.

The resistance 57 is connected to the anode 102 of the rectifier 103, and the cathode 104 is connected to the point 98 to provide a unidirectional charging source for the condenser 58. The rectifier 103 may be of any desired type, such as a diode vacuum tube, a germanium crystal, or the like, and is shown as a diode vacuum tube only for the purposes of illustration. The voltage appearing across the resistance 57 and the condenser 58 is proportional to the average voltage appearing across the resistance 97, the voltage at point 105 being negative with respect to ground. The voltage at point 105 is therefore also proportional to the vector 23 previously discussed in connection with Fig. 2.

The voltage appearing at point 105 is impressed on the control grid 54 through the secondary winding 33, and is additive to the voltage produced across the resistance 37 connected between the cathode 36 and ground. The bias on tube 35 is therefore the sum of its self-biasing system and a voltage proportional to the vector 23 of Fig. 2, and since the amplification factor of the tube is reduced by the application of a negative voltage to its grid, its amplification factor is therefore inversely related to the length of the vector 23.

The operation of the present invention is as follows: energy arriving at the receivers 13 and 14 will produce voltages therein which are substantially equal and displaced from each other by a phase angle proportional to the displacement of one receiver with respect to the other in the plane in which direction is to be measured. The voltages produced by the receivers 13 and 14 are impressed on the transformers 32 and 67 which produce voltages proportional to the vector sum and the vector difference, respectively. The voltage induced in the secondary winding 33 of the transformer 32 is amplified in a variable amplification factor amplifying tube 35 and the output of the tube 35 is further amplified and impressed on the reproducing means 64.

The voltage induced in the secondary winding 72 of the transformer 67 is amplified by the tube 75 and converted into a negative voltage proportional to the vector difference, which voltage is impressed on the control grid 54 of the tube 35 to control the amplification factor thereof. Adjustment of the potentiometer 84 regulates the variation in amplification of the tube 35, and therefore the directivity of the installation.

Referring to Fig. 4, the directional characteristic of the receivers is illustrated by the curve 111, the voltage produced by the receivers being represented by the ordinate while the angular disposition of the receivers with respect to the direction of arrival of the wave energy is represented by the abscissa. It will be observed that this characteristic is quite broad so that accurate determination of direction is difficult if not impossible. However, when the amplification of the receiver response is controlled inversely in accordance with the vector difference between the two response voltages, the directional curve is sharpened considerably because the response to energy received on the slope of the curve is attenuated so so that the effective directional characteristic resembles the curve 112, which characteristic is highly directional so as to greatly improve the accuracy of the installation to within plus or minus about two degrees as compared with plus or minus five degrees.

The potentiometer 84 is provided in the anode circuit of the tube 75 to provide an adjustment of the directional characteristic of the apparatus by determining the attenuation of the sides of the curve 111. By a proper use of this control, the characteristic may be adjusted to produce a broad pattern for searching for a target and a sharp pattern for accurately determining the direction to the target, thus making the apparatus quite flexible in application.

It will be readily apparent to those skilled in the art that many changes and modifications may be made in the device herein described without departing from the spirit thereof. The variable amplification amplifier may consist of any number of stages desired, as may the amplifier for the difference voltage. The receivers 13 and 14 may be connected to individualized windings on the transformers 32 and 67 if it is desired to isolate them one from the other. Filters may be incorporated in either or both of the amplifiers to aid in the identification of a target and to increase the directivity of the system still further by eliminating interfering frequencies. It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. In a direction finding system, a pair of spaced sound responsive devices adapted to be rotated about an axis and each producing an output voltage in response to sound energy displaced from the other output voltage by a phase angle proportional to the angular displacement of a line connecting said spaced sound responsive devices from perpendicular to the direction of arrival of said sound energy, combining means connected to said pair of spaced sound responsive devices to produce a voltage proportional to the sum of said output voltages and a voltage proportional to the difference between said output voltages, first amplifying means comprising a pentode tube having an amplification factor controllable by the direct current bias voltage on its control grid and connected to said combining means to receive the voltage proportional to the sum of the output voltages, second amplifying means connected to said combining means to receive the voltage proportional to the difference between the output voltages for producing a direct current voltage proportional to the difference between said output voltages, means associated with said second amplifying means for selectively varying the amplification thereof, and means for impressing said direct current voltage from said second amplifying means on the control grid of said pentode tube to control the amplification factor of said first amplifying means, whereby the directivity of said direction finding system is controlled by regulating the amplification factor of said second amplifying means.

2. In a direction finding system, a pair of sound responsive devices, a first transformer having a center-tapped primary having its end terminals connected to said pair of sound responsive devices respectively and a secondary winding, an amplifier comprising a pentode tube having an amplification factor inversely controllable by a direct current bias voltage connected to the secondary winding of said first transformer, reproducer means connected to the output of said amplifier, a second transformer having a primary winding having the terminals thereof connected to the center-tap of the primary winding of said first transformer respectively and to said sound responsive devices respectively and a secondary winding, a second amplifier connected to the secondary winding of said second transformer, rectifier means connected with said second amplifier for producing a direct current voltage proportional to the voltage induced in the secondary winding of said second transformer, and means impressing said direct voltage on said pentode tube to control the bias thereon, whereby the response of said reproducing means is attenuated as the voltage induced in said secondary winding of said second transformer increases.

3. The device as claimed in claim 2 which includes means controlling the gain of said second amplifier, whereby to control the directivity characteristic of said direction finding system.

4. In a direction-finding system, a pair of spaced sound responsive devices mounted for rotation about an axis, each sound responsive device having a directional characteristic and each producing an output voltage in response to sound energy displaced from the other output voltage by a phase angle proportional to the angular displacement of a line connecting said spaced sound responsive devices from perpendicular to the direction of arrival of sound energy, a first transformer, a primary winding connected to said sound responsive devices and a secondary winding, said first transformer producing in said secondary winding a first voltage proportional to the vector sum of the output voltages of said sound responsive devices, a second transformer having a primary winding connected to said sound responsive devices and a secondary winding, said second transformer producing a second voltage proportional to the difference between the output voltages of said sound responsive devices, an amplifier connected to the secondary winding of said second transformer, rectifier means connected to said amplifier for producing a negative-going direct current voltage proportional to said second voltage produced in the secondary winding of said second transformer, a pentode tube having a control grid and an amplification controllable in inverse proportion to the negative bias impressed on its control grid, means connecting said control grid to an end of the secondary winding of said first transformer, means for impressing the negative-going direct current voltage on the other end of the secondary winding of said first transformer whereby to bias said control grid of said pentode tube to vary the gain thereof, and indicator means connected to said pentode tube, whereby the apparent directional response of said sound responsive devices is enhanced.

References Cited in the file of this patent

UNITED STATES PATENTS

| 2,044,789 | Hefele | June 23, 1936 |
| 2,051,032 | Eddy | Aug. 18, 1936 |
| 2,074,408 | Lowell | Mar. 23, 1937 |
| 2,166,991 | Guanella | July 25, 1939 |
| 2,438,526 | Waterman | Mar. 30, 1948 |
| 2,456,666 | Agate | Dec. 21, 1948 |

FOREIGN PATENTS

| 610,664 | Great Britain | Oct. 19, 1948 |